June 5, 1945.  J. SUNNEN  2,377,588
HONING MACHINE
Filed Jan. 21, 1942   6 Sheets-Sheet 1

Inventor
JOSEPH SUNNEN

Attorney

JOSEPH SUNNEN

June 5, 1945.  J. SUNNEN  2,377,588
HONING MACHINE
Filed Jan. 21, 1942   6 Sheets-Sheet 4
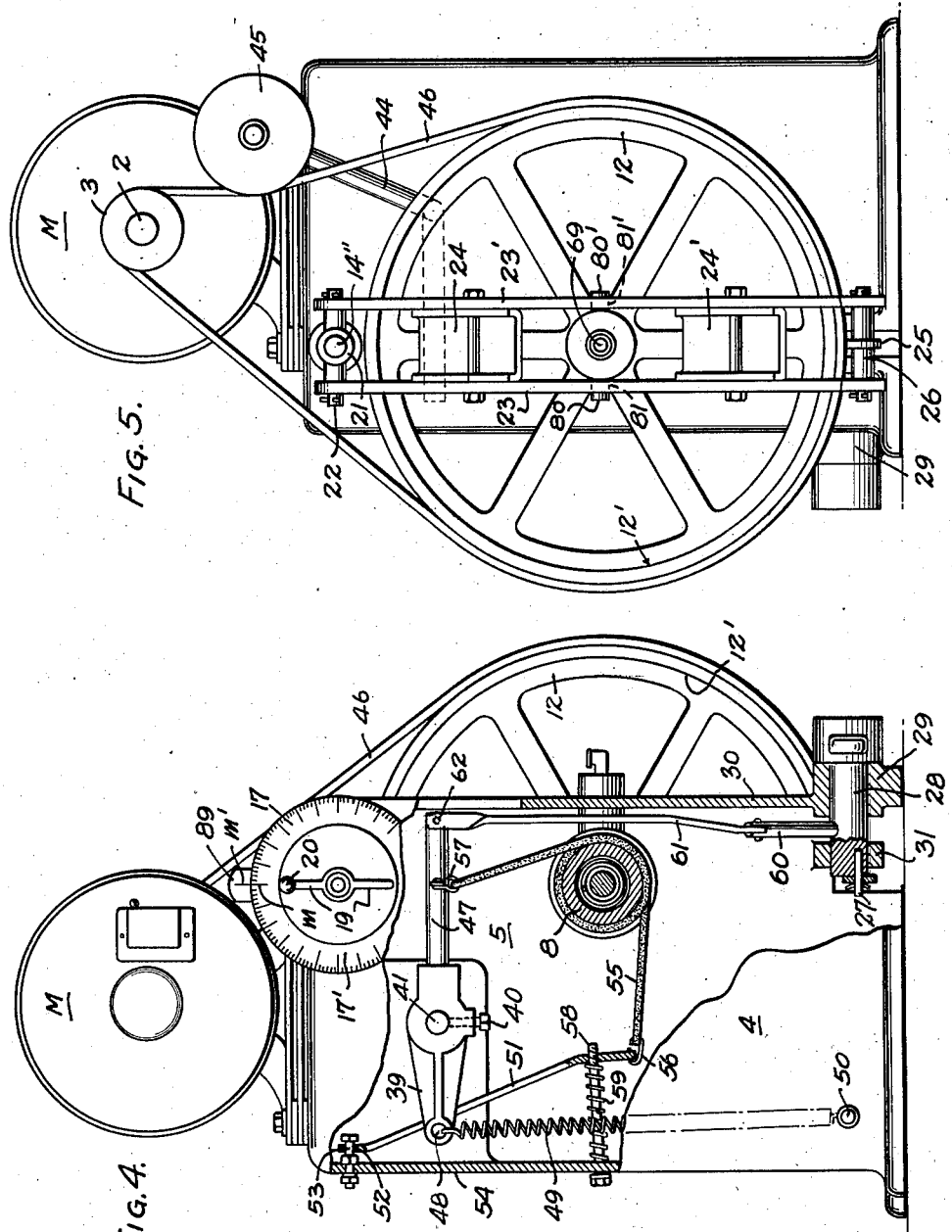
Inventor
JOSEPH SUNNEN

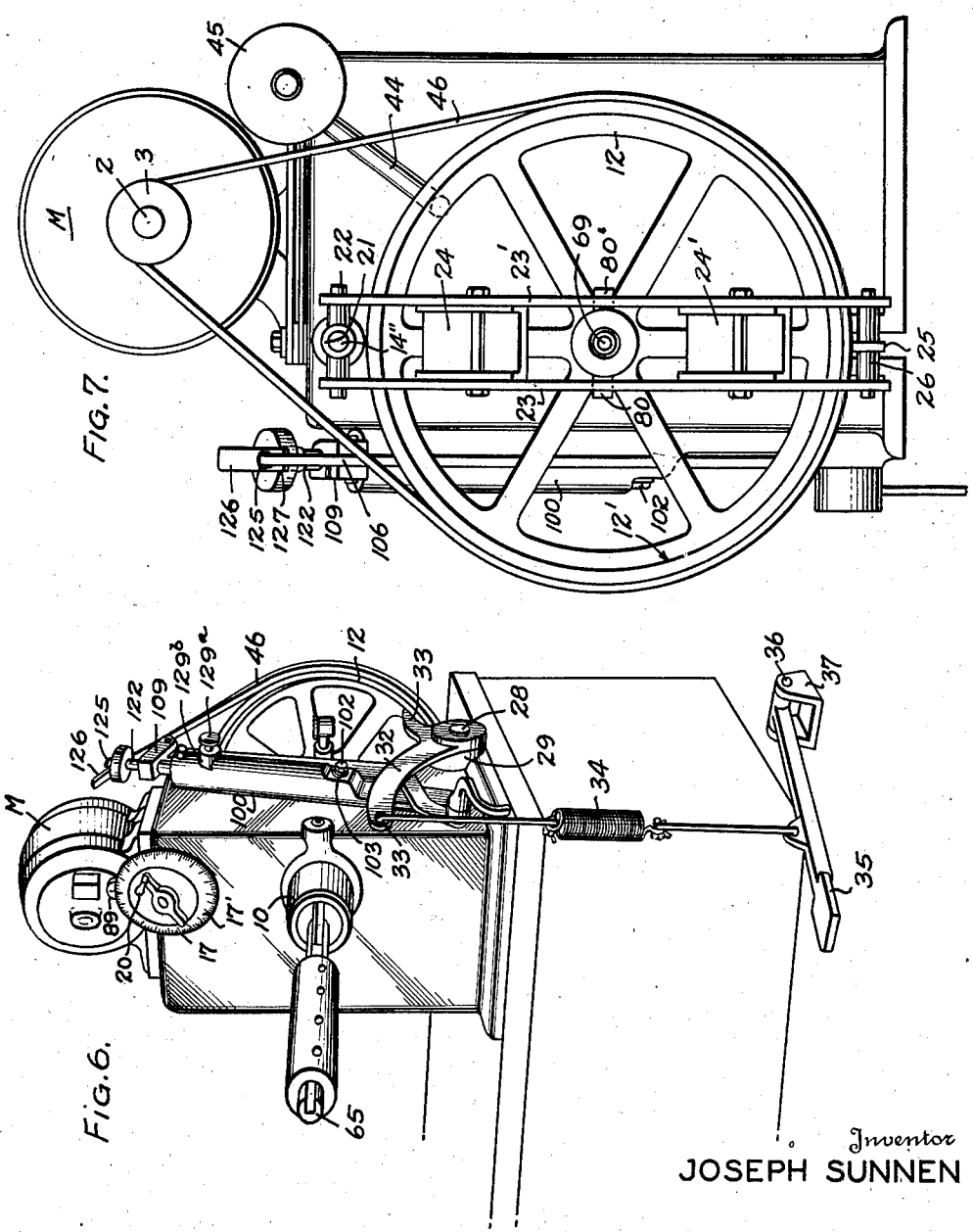

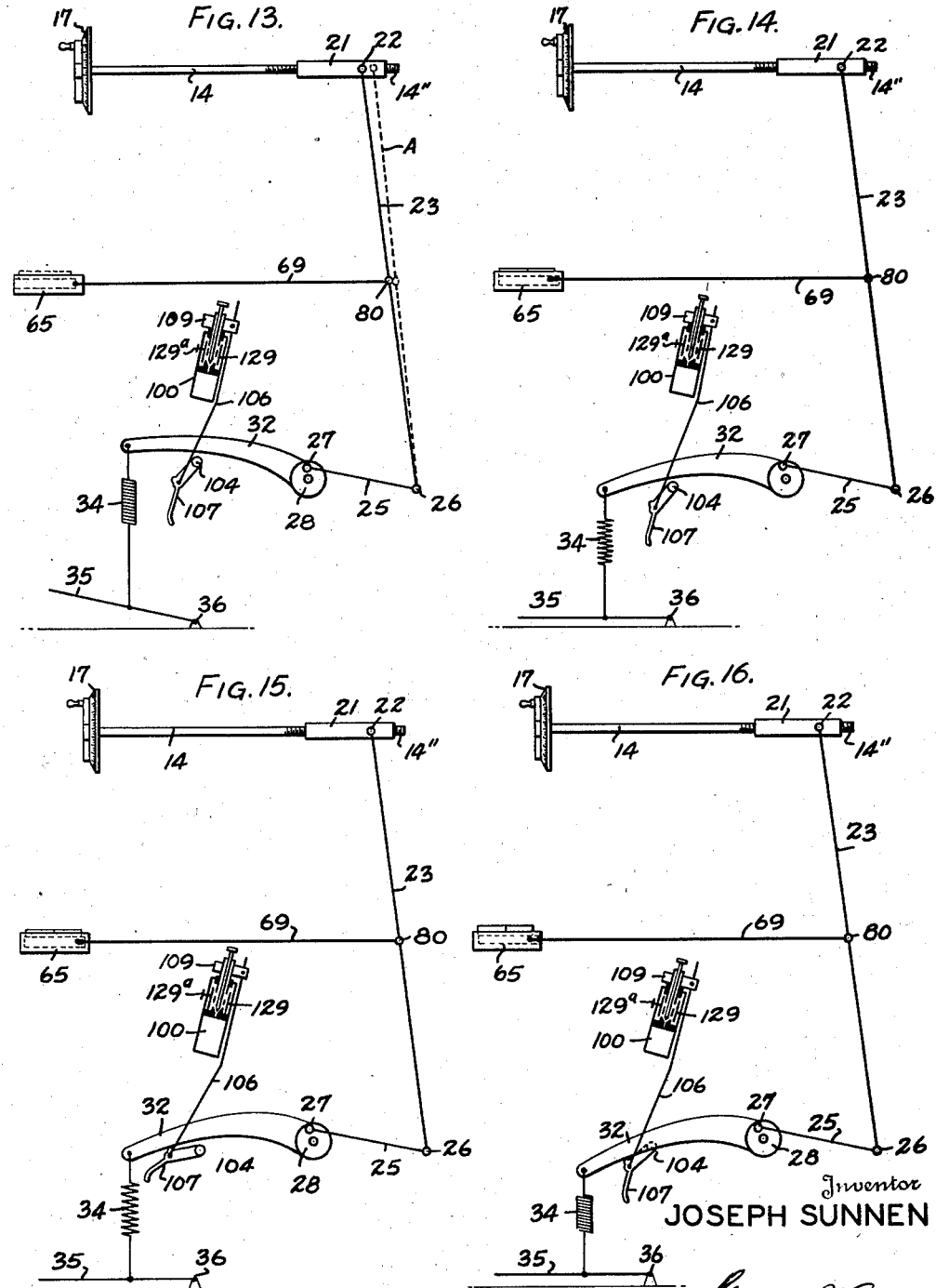

Patented June 5, 1945

2,377,588

UNITED STATES PATENT OFFICE 2,377,588

HONING MACHINE

Joseph Sunnen, Clayton, Mo.

Application January 21, 1942, Serial No. 427,655

15 Claims. (Cl. 51—184.3)

This invention is illustrated as an improvement upon my prior Patent No. 2,070,381 for Pin hole grinder, although it is adaptable for use in analogous arts wherein a surface working tool is caused to contact a working surface for a desired operation.

In my prior patent no provision was made for automatically feeding and controlling the movement of the hone or surface working tool either to or from work engaging position or during the actual working operation, nor was provision made for retarding or cushioning the hone and its actuating mechanism during essential periods.

The present invention comprehends a structure embodying the substance of my prior Patent No. 2,070,381 and wherein a fluid retarder is incorporated to cushion and regulate by variable means the movement of the hone, and preferably the movement at the time of engagement between the hone and the surface to be worked and during the subsequent working period.

Broadly this invention embodies as an associated element with the retarding mechanism, a resilient means capable of operating as a spring motor to feed the hone during the periods in which the retarder is effective, the association of these parts being such as to permit relative adjustments of the parts for accomplishing predetermined operations particularly at work engaging position and during working operation.

More specifically this invention embodies a machine in which radially adjustable hones or other working elements are provided with manual feed means for advancing the same to work engaging position and during cutting operation, the manual means being augmented by a spring motor in which energy is stored by virtue of the movement of the manual means and which energy functions to continue the radial movement of the operating parts after the manually actuated member has been moved to a predetermined position, the operation of the surface working elements by virtue of the spring motor being regulated by a suitable retarder and the various parts being individually and relatively adjustable for synchronized predetermined movement.

One of the objects of this invention is to provide a hone structure including an adjusting mechanism for the individual hone elements by means of which uniform travel of these elements is assured, thus rendering the automatic movement by virtue of the associated retarder and spring actuator, or control member, substantially constant.

A further object of this device is to provide means which will limit the rate at which the hone may be fed into the metal or forced against the inner surface of the hole which is being finished.

Another object comprehends the provision of means for regulating or resetting the retarder so that the effective movement of the hone can be regulated or predetermined.

A still further object is to provide an adjustment for the resilient feed or actuator so that its actuation of the hone will be variable in respect to its limit of movement or stroke but constant at predetermined times insofar as the rate of speed is concerned.

Other objects reside in the provision of various means for regulating and controlling the cooperating parts to provide for their proper synchronized functioning; the provision of an indicating means for indicating the termination of the working stroke under spring energy and control means for permitting an operator to regulate with absolute accuracy the stroke adjustment of the hone.

Other objects will more clearly hereinafter appear by reference to the accompanying drawings forming a part of this specification and wherein like characters of reference designate corresponding parts throughout the several views in which:

Figure 4 is a front elevation partly in section;

Figure 5 is an end elevation;

Figure 6 is a perspective view;

Figure 7 is a rear elevation with the belt tightener and other parts in idle position;

Figure 8 is a top plan view of the mandrel and hone assembly;

Figure 9 is a vertical sectional view of Figure 8;

Figure 10 is a transverse section through the hone assembly at the end of the hone guide retainer;

Figure 11 is a transverse section through the mandrel-hone assembly at a point intermediate one of the vertical guide ways;

Figures 13, 14, 15 and 16 are diagrammatic views illustrating the actuating and control mechanism of the honing machine in various stages of its operation, including the preliminary stages which involve the setting of the retarder mechanism.

Figure 12:
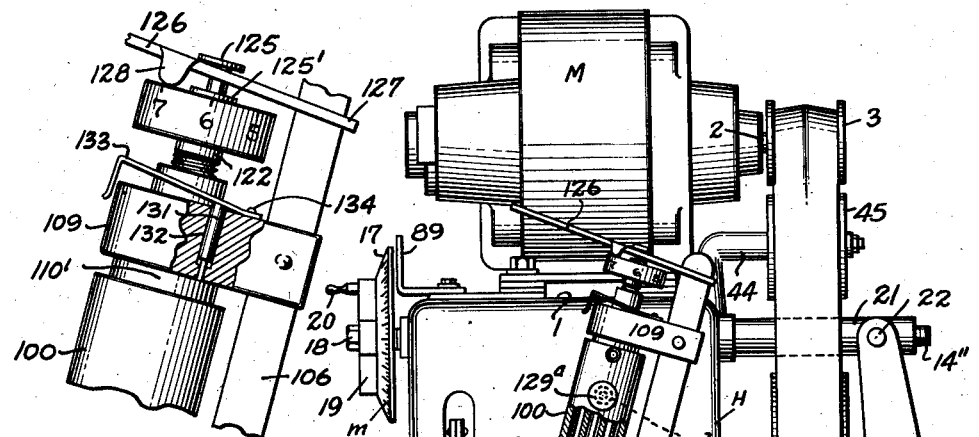
Figure 12 is an enlarged side elevation of the upper end of the retarder chamber.

In the drawings, H represents a grinding machine housing on the top 1 of which is mounted an electric motor M, on the shaft 2 of which is the drive pulley 3 disposed toward the rear of the housing H.

In the front and rear walls 4 and 5, respectively, there are formed bearings 6 and 7 for a hollow spindle 8 held therein by shoulder 9, produced by the enlarged spindle head 10, and the hub 11 of a pulley 12 fixed by a set-screw 13 to the spindle 8. Disposed above and in vertical alinement with the spindle 8 is a rod 14 rotatably mounted in bearings 15 and 16 in the front and rear housing walls 4 and 5, respectively. The forward end 14' of the rod 14 is of reduced diameter and is provided with screw threads $t$ for receiving a dial 17 and lock-nut 18 whereby the dial is securely fixed to the rod 14. The dial 17 is provided with oppositely disposed wings 19, and a handle 20 for ease of manipulation. The rearward end 14" of the rod 14 is provided with screw threads for receiving a threaded sleeve 21, to which is pivotally connected by means of pins 22 the upper end of a yoke comprising a pair of spaced bars 23, 23'. The bars 23, 23' are maintained in fixed spaced relation by channel pieces 24, 24' riveted or spot-welded to the bars 23 as shown. The lower end of the yoke has connection with a link 25 through the medium of a pivot pin 26, the opposite end of said link 25 being connected to a pin 27 eccentrically fixed into the end of a rock shaft 28 rotatably mounted in a bearing 29 formed in side wall 30 of housing H, and a bearing 31 spaced from the bearing 29 and projecting from the rear wall 5 of said housing.

Figure 1:
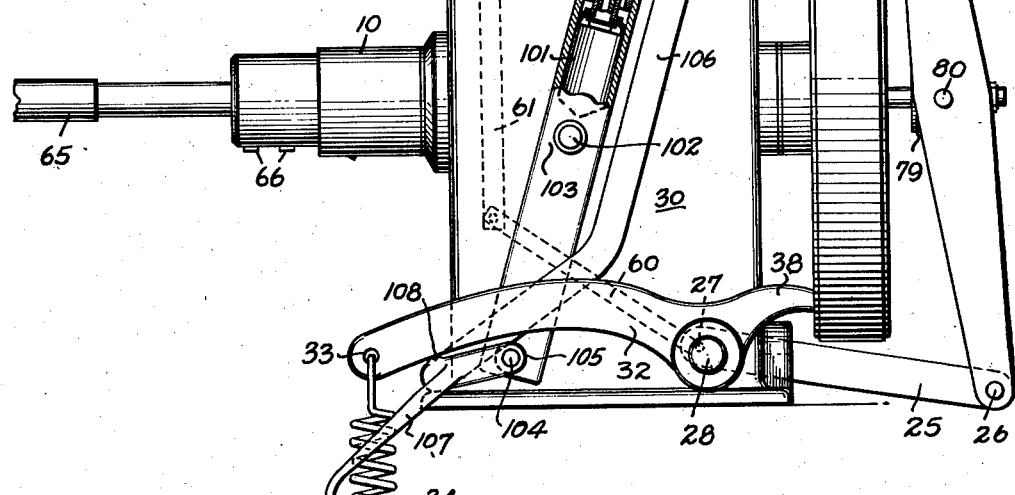
Figure 1 is a side elevation of the honing machine incorporating the present invention, with parts broken away in section.
Figure 2:
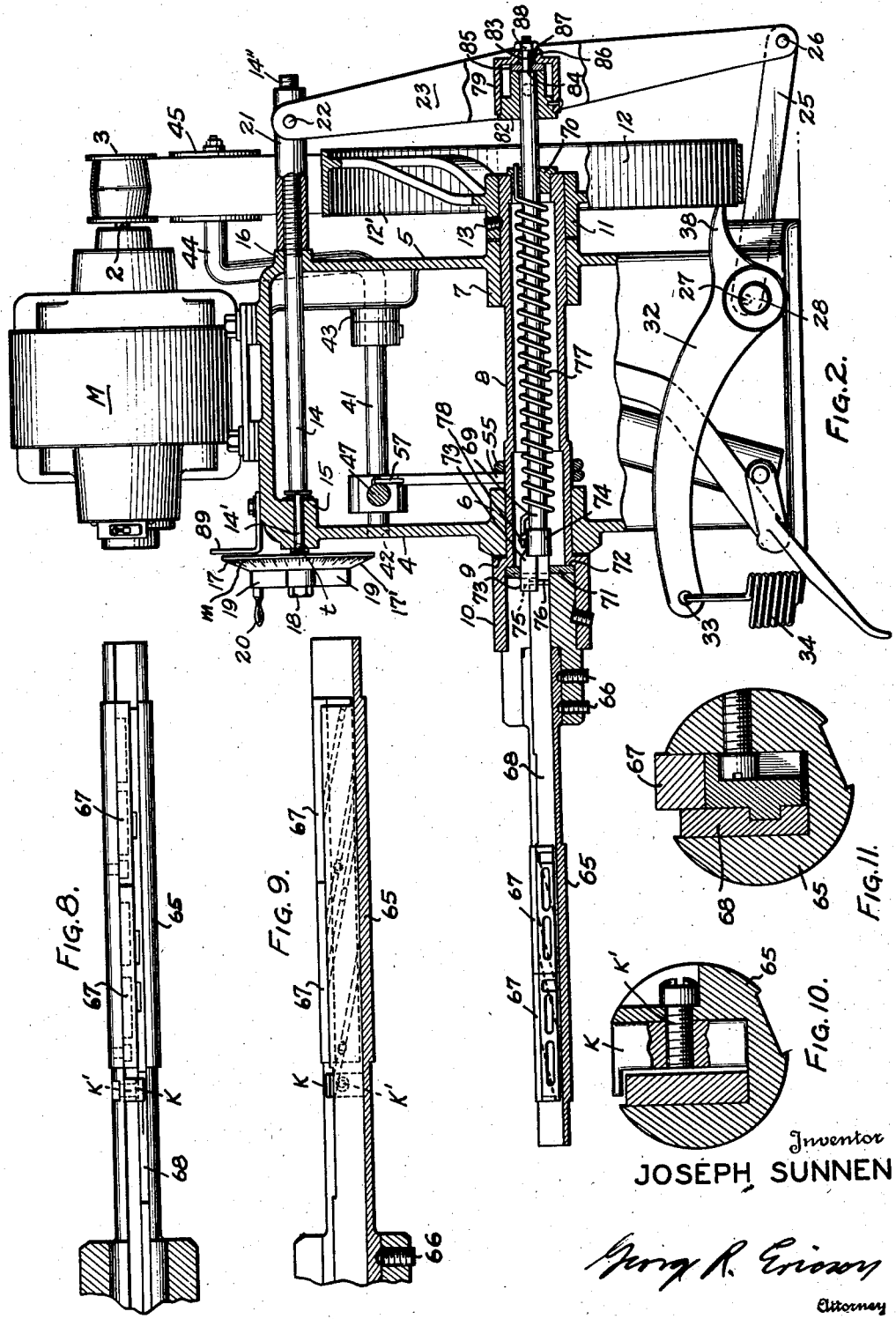
Figure 2 is a vertical sectional view.
Figure 3:
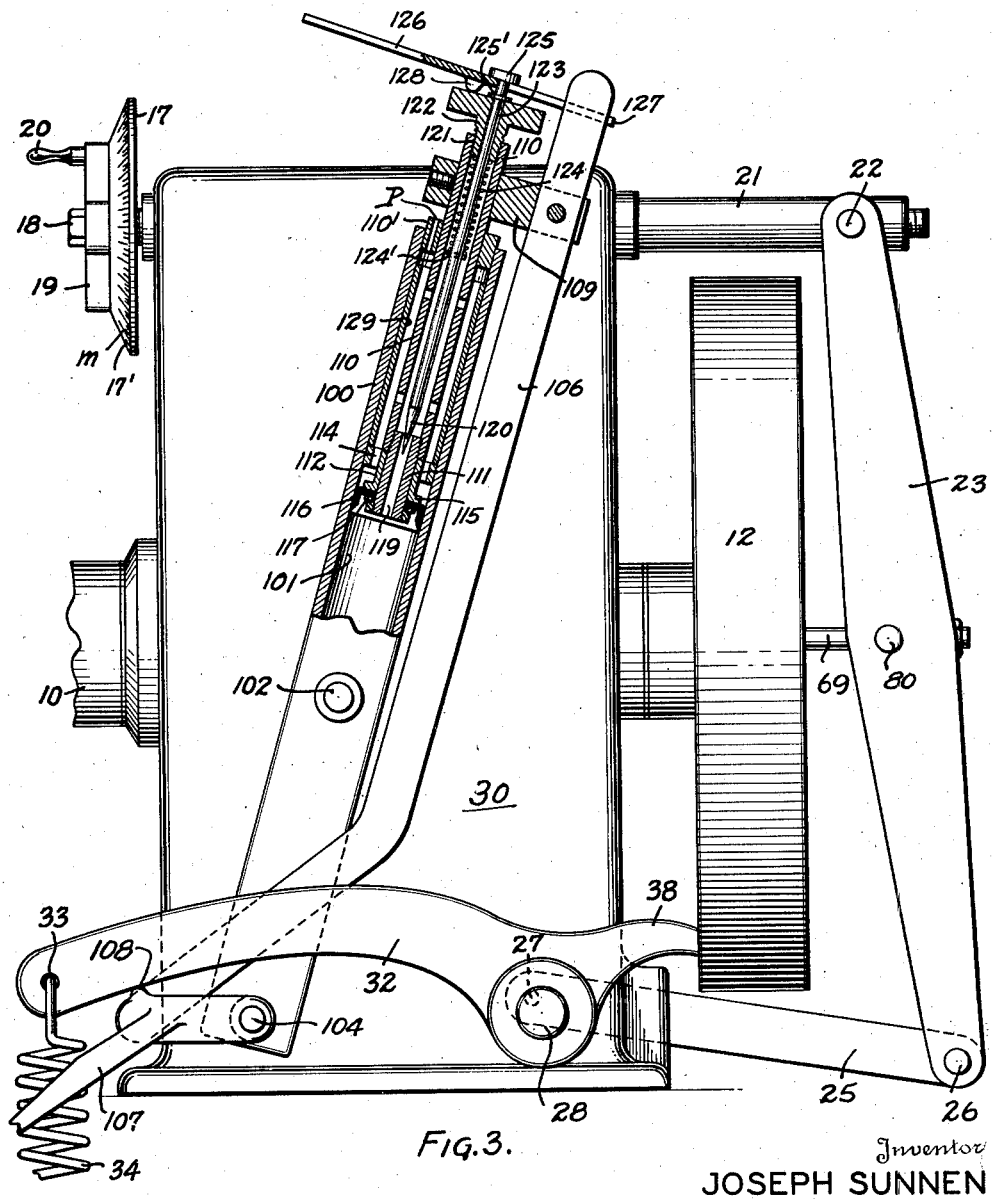
Figure 3 is a side elevation slightly enlarged with parts broken away in section.

The rock shaft 28 is integrally formed with a lever 32 on the outside of housing H and extending forwardly thereof, said lever having an eye 33 at its forward end in which is secured one end of a coil spring 34 interposed between said lever 32 and the treadle 35, the purpose and function of which will be more fully hereinafter described. The treadle 35 is pivoted at 36 to a fixed floor plate 37 as shown in Figure 1. The lever 32 is formed with rearwardly extending finger 38 which contacts the inner face 12' of the large pulley 12 and acts as a stop to limit the movement of lever, this engagement between these parts tending to act somewhat as a brake to retard the movement of the parts.

A rock shaft 41 is mounted in bearings 42, 43 in the front and rear housing walls 4 and 5, respectively. A rocking lever 39 is secured by means of the set screw 40 to the rock shaft 41. The shaft 41 passes through the rear wall 5 of the housing and is bent to provide a crank arm 44 on the end of which is mounted an idler pulley 45. The length and position of the crank 44 is such that the idler pulley 45 operates in contact with belt 46, the latter passing over the motor pulley 3 and grinding machine pulley 12. The lever arm 39 is formed with a terminal eye 48 for connection with one end of a coil spring 49, the opposite end of the spring being anchored to a pin 50 secured in housing wall 4 near the bottom thereof. The spring 49, together with the braking member about to be described serves to hold the rocking lever 47 in a horizontal position and also retain the lever 32 in its normal uppermost position.

The braking member comprises a bracket 51 having an opening 52 at its upper end whereby it is loosely connected to a bolt 53 secured in housing side wall 54, and a belt 55 fixed at one end in an eye 56 in the lower end of bracket 51, said belt being wrapped around the spindle 8 and having its other end fixed in a screw eye 57 fastened onto a lever arm 47. The lever arm 47 is fixed to the inner end portion of the rocking lever 39 and extends in an opposite direction thereto. The lower end of bracket 51 is anchored to the housing wall 54 by a bolt 58 on which is mounted a coiled spring 59 for urging the lower end of bracket 51 away from housing wall 54. A stem 60 is fixed in the rock shaft 28 projecting forwardly for convenient connection by means of link 61 with the lever arm 47 by means of pivotal connection 62 whereby the tension of the spring 49 will retain the lever 32 in upper or inoperative position, determined by the stop finger 38 and its engagement with face 12' of pulley 12. It is by means of this link 61 that the brake 55 is actuated upon downward movement of the lever 32 upon depression of the treadle 36, which treadle movement also actuates the belt tightener 45, adjusts the hones and otherwise initiates the machine operations.

The driving mandrel 65, on which no claim is made in this application, is fixed on the head 10 of spindle 8, the set-screw 66 contributing to hold the mandrel securely in the head 10, and the longitudinally disposed grinding stones 67, 67' are adjusted radially by the wedge-bar 68 connected to a feed rod 69 mounted for longitudinal sliding movement in the spindle 8. The feed rod 69 is supported by a bushing 70 fixed into the rear end of spindle 8 and by a slotted disk 71 fixed in the bottom of the spindle head 10 against a shoulder 72. A link 73 has a socket 74 into which the outer end of the feed rod is secured and also has a transverse slot 75 near its free end to receive a lip 76 turned over at the end of wedge-bar 68 of the mandrel 65. Thus, the wedge-bar is connected to the feed rod 69 so that longitudinal movement of the feed rod, either out or in, will be communicated to the wedge-bar and effect adjustment of the grinding stones 67, 67'. The connection of the wedge-bar 68 with a sliding feed rod for the purpose of adjusting the grinding stones is not new per se as such a device is shown in my co-pending application. The novelty of the present invention is restricted to the grinding machine and control means therefor, exclusive of the mandrel or other tool carried by the machine. A spring 77 is coiled about the feed rod 69 and has one end connected to a hook 78 projecting from the socket 74, and the other end is fixed in the bushing 70, the tendency of the spring being to hold the feed rod rearwardly and take up the longitudinal play thereof. Since the feed rod 69 rotates with the driving spindle 8 and is also connected to the yoke comprising the spaced bars 23, 23', the latter connection must be swiveled.

This is accomplished by the housing 79 having diametrically opposed pins 80, 80' rotatably supported in openings 81, 81' of bars 23, 23' and bearing 82 fixed in the housing 79 in which bearing the end of feed rod 69 is rotatably mounted. The diameter of the feed rod 69 is reduced at its rearward extremity to provide a stem 83 and a shoulder 84, said shoulder operating against a washer 85 to take the end thrust of the feed rod 69. The stem 83 passes through an opening 86 in the end of housing 79 and a bushing 87 is disposed about said stem to take the wear. The end of stem 83 is threaded to receive a nut 88.

From the foregoing it is apparent that the yoke comprising the bars 23, 23' may be moved to operate the feed rod 69 without interfering with the rotation of said feed rod. It will be observed that the beveled face 17' of disk 17 has graduation marks $m$, some of which are numbered from one to eleven. The spaces between successive numbers are shown to indicate adjustments of the feed rod 69 to effect a grinding operation of .001". The spaces between the numbered graduations are again divided into ten parts to effect adjustments as small as .0001", all of which will be explained more in detail hereinafter. In order to facilitate the accuracy of these adjustments a bracket 89 is mounted on the housing H so as to project above the center of disk 17 and a base graduation mark $m'$ appears on the face of the bracket 89 to which the graduations on the disk face 17' are referred in order to effect a reading.

The substance of the grinding machine previously described is generally old in my prior patents and applications, only minor changes having been made to enable the adoption of the novel features about to be described. In the foregoing apparatus no provision was made for retarding the speed of the adjustment of the hones or other surface working tools at approximately the time of their engagement with the work. It will be obvious that to expand the hones too quickly at the time of their engagement with the work might result in injury to both the hone and the work, and yet it is essential in production work that the preparatory adjustments must be accomplished as quickly and efficiently as equipment and circumstances permit. It is also desirable to effect the feeding of the tool into the work by a sufficient amount of positive and yet resiliently applied energy. In order to accomplish the foregoing there is provided a retarding means with an adjustment therefor whereby the normal rapid movement of the hones to work engaging position will be retarded at a point representing a minimum of tolerance between the hones and the surface to be ground. The travel of the hones during grinding movement is brought about by spring energy in which a preloaded spring is caused to function by the actuation of that part of the assembly initiating the hone movement to work engaging position. Thus there is utilized both energy giving and energy absorbing means cooperating to synchronize the tool to obtain maximum efficiency.

Referring again to the drawing, there is illustrated a retarding mechanism including the cylinder 100 formed with fluid chamber 101 at the upper portion thereof, the lower portion being deformed to provide clearance for the movement of the combined crank arm stop, return handle and lever arm, which part will be more fully described. The cylinder 100 is secured to the side wall 30 by mounting bolt 102, the bolt extending through the cylinder intermediate its length with the cylinder wall flattened as at 103 whereby the outer end of the bolt is substantially flush with the surface of the cylinder. Below the flattened surface 103 the outer face of the cylinder is set back substantially and at the end portion a slight boss is provided through which the stop pin 104 extends. The stop pin 104 is fixed in the side wall 30 and forms a mounting for the extremity 105 of the combined crank arm stop, return handle and lever arm.

It will be noted that the foregoing parts are so constructed and arranged that when assembled the crank arm lever 106 moves in a plane intersecting the axis of the cylinder, with the return handle 107 and stop 108 in cooperative position with respect to the lever arm 32. The upper end portion of the crank arm lever 106 extends well above the upper end of the cylinder and has secured thereto a connecting arm 109 which is fixed to and embraces the perforated piston rod 110 and actuates the same and the piston carried thereby within the cylinder 100. The closure plug 110' for the upper end of the cylinder is axially bored to form a guide for the piston rod 110. This plug 110' is illustrated as extending beyond the cylinder wall to form a stop to engage the under face of and seat the arm 109, thus limiting the retarded stroke of the piston. A breather hole $p$ is provided in the plug to permit the retarding fluid to flow in a proper manner.

The tubular perforated piston rod 110 is connected to the upper externally threaded end portion of the hollow stud bolt 111 which extends axially through the piston head 112, the latter including the perforated cylindrical guide portion 114 and the lower outwardly flanged extremity 115. The flange 115 is of less diameter than the cylinder to permit escape of fluid back into the cylinder by the flexing of the cup washer 116 upon idle stroke of the piston. The cup washer 116 is seated on the piston head flange 115 and is formed with a central opening through which the hollow stud bolt 111 extends. The lower end of the stud bolt 111 centers the cup washer 116 and the latter is clamped between the washer 117 and the flange 115 by said bolt. The bore 119, formed axially through the bolt 111, is relatively small and the upper end thereof forms with the needle 120 a control port or by-pass to regulate the escape of the fluid and thus the retarded movement of the piston assembly in its cylinder. The upper end of the perforated tubular piston rod 110 is internally threaded at 121 to receive the plug 122, the latter being formed with axial bore 123 for the passage of the upper end portion of the needle valve 120 and an enlarged knurled calibrated head is provided to facilitate its adjustment and thereby the adjustment of the needle valve 120. A coiled spring 124 is arranged around the upper portion of the needle valve 120 within the tubular piston rod 110 to urge the needle normally toward seated position at the upper end of the bore of the stud bolt 111. The spring is fixed at its lower end to the needle by means of pin 124' and abuts against the lower face of the plug 122 in a manner to properly function as described. The upper end of the needle valve 120 which extends through the upper end of the plug 122 is formed with spaced annular flanges 125 and 125', the former acting as a stop to seat against the top of the plug 122 and the latter being arranged at the outer extremity of the needle to provide an enlarged head for cooperation with the release arm 126. The release arm 126 is bifurcated to form spaced arms 127 and intermediate and at approximately the crotch thereof is arranged the shank of the needle while the extremities of the arm are spaced at each side of the upper end of the connecting rod 106. Formed on the lower face of the release arm 126 is the depending lug 128 which acting upon the upper face of the plug 122 functions as a pivot for the rocking of the arm 126 to lift the needle 120 to permit rapid unloading of the retarder chamber. Within the cylinder 100 is means for adjustably limiting the return stroke of the piston, and in turn regulating the setting of the automatic operating mechanism controlling the feeding of the hones or analogous surface working elements. This adjustable means consists of a cylindrical sleeve 129 which snugly fits within the cylinder 100 and is of such length as to permit axial longitudinal movement representing maximum adjustments desired. To secure the sleeve in adjusted position is the thumb screw 129a which is threaded through the boss 129b in the cylinder wall for binding the sleeve.

To determine the end of the working stroke, in this instance the termination of the honing operation under the automatic feed of the spring motor, it is essential that indicating means be provided. This means includes the use of a pin 131 in bore 132 in arm 109, which pin engages the upper face of the plug 110' upon downward movement of the piston and lifts the spring arm 133, the movement of the latter being readily discernible. It will be noted that the bore 132 is enlarged at its upper portion and the pin 131 is similarly shaped to limit its downward movement. The pin 131 extends through the bottom of the bore a distance representing maximum movement of the piston, which is the movement involved. The spring arm 133 is fastened to the top of the arm 109 by screw 134 and normally seats upon the top of this arm. The outer end portion of the spring arm 133 is bent downwardly over the outer face of the arm 109 providing a lip which is in a position to be readily viewed for the purpose of determining its movement or lack of movement.

The use of the preloaded spring 34 between the lever 32 and the treadle 35 permits the flooring of the treadle without positively actuating the hones their full movement. This is brought about by interposing in the mechanism the retarding means heretofore described and by means of which it is possible to positively regulate and determine the interval of lag of hone movement. In the first instance the arrangement of the spring 34 may be such that it will of itself permit a lag in the hone movements, particularly where the treadle is hurriedly floored. The positive regulated operation is essentially caused and determined by the arrangement and adjustment of the retarding mechanism. For instance the hones being fully withdrawn into the arbor, the operator will place an unfinished piece of work on the arbor, pull down on the crank arm by means of the treadle until the hone just begins to contact the work, then without changing the position of the crank arm he loosens the sleeve stop adjustment screw and manually lifts the lever 107 until the stop portion 108 contacts the bottom of the lever 32. Lifting the lever also raises the piston by means of the link 106 and carries the sleeve stop upwards with it. When the lever 107 has been raised up against the lever 32, the operator then tightens the sleeve by screw 129a, it being permissible to adjust slightly for desired tolerances, thus locking it in position and preventing further upward movement of the lever 107 or piston 112. This limits the amount of slow speed or retarded movement of the hones. After such an operation increase in the retarded operation can be provided for by manipulation of the dial 17 which regulates the adjustment of cross arm 23, as fully set forth in my former patent.

To more clearly describe and illustrate the teaching of the present development, I have included in the drawings diagrammatic views (Figures 13 to 16, inclusive) which represent the relative position and movement of parts essential to the embodiment. As previously outlined it is necessary to definitely set the retarding mechanism for a predetermined honing operation. This retarding mechanism is set by the adjustment of the cylindrical stop 129 in the retarder chamber 100 which determines the period in the hone movement at which the retarding mechanism becomes effective. Fig. 13 illustrates the relative position of the parts prior to the setting of the stop cylinder 129 for a honing operation. In this view the mandrel 65 is illustrated with the hones retracted, but in dotted lines these hones are represented in position comparative to the adjustment which may be obtained through the shifting of the cross arm 23 to the extent represented at A (dotted lines) by the shifting of the cross arm 23 through the adjusting rod and dial index 17.

Still referring to Fig. 13 and the setting of the arbor for a predetermined honing operation, the operator before starting production will place an unfinished piece of work on the spindle and with or without starting the spindle or hone arbor to rotate will pull down on the crank arm by means of the foot pedal 35 until the hones just begin to contact the metal. The relative shifting of the parts by this operation is illustrated in Fig. 14. Having brought the hones into a position approximately contacting the surface to be worked, the operator, then without changing the position of the crank arm 32 loosens the sleeve stop 129 by turning the screw 129a, and manually lifts the lever 107 until the top portion contacts the bottom of lever 32. Lifting the lever 107 raises the piston in the retarder cylinder 100 through the connecting members 106 and 109 and carries the sleeve 129 upwardly with it. Since the lever 107 has been raised up against the lever 32 the operator then tightens the adjusting screw 129a against the sleeve 129, thus locking it in position and preventing further upward movement of the lever 107 or further upward movement of the piston. This setting is for the purpose of limiting or determining the amount of slow speed feeding prior to reaching the stop, it being understood that this amount of slow speed feeding may depend upon a number of conditions but usually depends upon the amount of surface to be removed from each piece which is to be worked upon. In Fig. 15 the stop 129 has been set with the lever 107 contacting the lever 32 in the manner above described. To further speed up the operation the operator may wish to advance the hones to their expanded position without interference by the retarding means and to accomplish this the control needle may be operated by the member 126 which permits a rapid unloading of the retarder chamber.

In Fig. 16 the parts are shown after completion of the honing operation, the piston having been moved through the actuation of lever 32 by the treadle 35 and connected spring 34 until the member 109 on the connecting rod 106 engages the top of the retarder cylinder. It will be noted in Fig. 15, in which figure the hones are represented as in substantially work engaging position as determined by the setting of the sleeve 129 in the manner heretofore described, that the cross member 109 is relatively spaced with respect to the retarder chamber, this spacing representing the travel of the hone during the grinding operation.

In Fig. 15 the treadle is practically floored and has extended the preloaded spring 34 so that the energy of the spring will be capable of continuing the downward movement of the lever 32, and related parts, until it has assumed its normal position as shown in Fig. 16. Thus, the energy of the spring after the flooring of the treadle provides sufficient power to overcome the retarding action of the fluid retarder 100 to carry the hones through their working movement and the energy in the preloaded spring is caused to function by the operation of the treadle to floored position.

Thus the dash pot regulates the rate of flow of stored energy from the preloaded spring 34 to the sliding hones during predetermined periods as determined by adjusting mechanism provided for this purpose.

I claim:

1. A grinding machine including a frame, a rotatable spindle mounted in said frame, a tool carried by said spindle, said tool including an abrasive element, said element being movable toward and away from working position, an operating member, a spring device, said operating member being connected to the abrasive element to effect movement thereof by means of said spring, said spring between the operating member and abrasive element being so constructde and arranged as to permit a lag in the movement of the abrasive element with respect to the movement of the operating member during actuation of the latter, and means for causing a lag in the movement of the abrasive element as it approaches working position.

2. An abrading machine including a frame, a spindle mounted in said frame, a tool carried by said spindle including an abrading element shiftable to and from working position, a feed rod connected to said abrading element to shift the same, an operating mechanism for said feed rod, and an operating lever connected to said feed rod by means of a resiliently expansible connection whereby upon movement of said lever said abrasive element may lag in its movement relative to the lever movement.

3. In a device of the character described, a frame, a spindle mounted in said frame, a surface working tool carried by said spindle and including an expansible and contractible abrasive element, axially movable means carried by said spindle and connected to said abrasive element to expand and contract the same, an actuating member, a resilient connection between said actuating member and said axially movable means whereby the latter is tensioned for shock absorption upon contact with the surface to be worked, said resilient connection being tensioned to cause movement of the tool upon operation of the actuating member, and fluid means retarding the latter portion of the movement of said abrasive element.

4. In a device of the character described, a frame, a rotary spindle mounted in said frame, a surface working tool carried by said spindle and including an expansible and contractible surface working element, axially movable means carried by said spindle and connected to said surface working element to expand and contract the same, an actuating member, a resilient connection between said actuating member and said axially movable means whereby the latter is tensioned for shock absorption upon contact with the surface to be worked, said resilient connection being tensioned to cause movement of the surface working tool when the actuating member has reached a predetermined position, fluid means retarding the movement of said surface working elements when actuated by said spring, and adjustable means for limiting the movement of said fluid means.

5. In a device of the character described, a frame, a spindle mounted in said frame, a surface working tool carried by said spindle and including an expansible and contractible surface working element, axially movable means carried by said spindle and connected to said surface working element to expand and contract the same, an actuating member, a resilient connection between said actuating member and said axially movable means, fluid means retarding the movement of said surface working element when actuated by said resilient connection, means for regulating said fluid means, and means operated by said fluid means to indicate a predetermined position of said surface working elements.

6. A grinding machine including a frame, a spindle supported in said frame for rotation, a tool supported by said spindle, a radially shiftable surface working element forming a part of said tool, a movable member for radially shifting said surface working element, said movable member being connected to said surface working element at one end portion, a cross arm connected intermediate its length to the other end portion of said movable member, said cross arm being adjustably pivoted at one end and its other end being connected to an operating means including a lever and coiled spring, said coiled spring being calibrated to permit a lag in the radial movement of said surface working element as said operating lever reaches the end of its stroke, and having sufficient energy to complete said radial movement, and a fluid retarder opposing said spring movement, said retarder including an indicator for determining the completed spring movement.

7. A grinding machine including a frame, a spindle supported in said frame for rotation, a tool supported at one end of said spindle, a surface working element forming a part of said tool and shiftable to and from working position, a movable member for shifting said surface working element, said movable member being connected to said surface working element at one end portion, operating means connected to the other end of said movable member for actuating same to radially move said surface working element, said operating means including a spring element so arranged as to permit a lag in the movement of said surface working element at a predetermined position in its movement, a fluid retarder resisting the movement of said surface working element subsequent to the lag in its movement, said spring being so tensioned as to gradually overcome the action of said retarder whereby the full movement of said working element is accomplished.

8. In combination, a grinding head including an expansible grinding element radially movable to and from working position, operating means for moving said grinding element to working position including an actuating member and a resilient connection between the same and said grinding element whereby said grinding element may lag in its movement with respect to the movement of said actuated member upon approaching work engaging position, a fluid retarder associated with said operating means to retard and regulate the radial movement of said grinding element as it approaches work engaging position, said resilient connection being tensioned to assist said operating means to move said grinding elements against the action of said retarder, and means for regulating the effectiveness of said retarder.

9. A grinding machine including a frame, a spindle mounted in said frame, a tool carried by said spindle including a shiftable metal working element, a feed rod axially movable in said spindle, one end of said feed rod being connected to said metal working element to shift the same, an operating mechanism for said feed rod including a yoke, said yoke being connected at a point intermediate its extremities to said feed rod and being adjustably pivoted adjacent one end to said frame, an operating lever and a coiled spring connecting said lever and the free end of said yoke, said spring being calibrated so that upon a full operation of said lever it will be tensioned to such a degree as to store sufficient energy to cause a shifting of the working elements throughout their entire working operation, and a fluid retarding means for regulating the movement of the metal working elements during the metal working stroke.

10. A grinding machine including a frame, a spindle mounted in the frame, a tool carried by said spindle including metal working element shiftable to and from metal working position, a feed rod for shifting said metal working element, manual means connected to said feed rod for moving said metal working element to work engaging position, a spring motor for moving said metal working element through its working operation, retarding means for said spring motor, means for regulating the amount of movement of said metal working element by manual means, and means for regulating the amount of movement controlled by the spring motor.

11. A grinding machine including a frame, a spindle mounted in the frame, a tool carried by said spindle including a metal working element shiftable to and from work engaging position, a feed rod for shifting said metal working element, manual means connected to said feed rod for moving said metal working element to work engaging position, a spring motor connected with said feed rod for moving said metal working element through its working operation, means for regulating the extent of movement of said metal working element by means of said spring motor, means for regulating the extent of movement of said metal working element by said manual means, and means for regulating the rate of movement of the working element under action of said spring motor without changing the extent of said movement.

12. A grinding machine including a frame, a spindle mounted in said frame, a tool carried by said spindle including a metal working element shiftable to and from working position, a control member, one end of said control member being connected to said metal working elements to shift the same, an operating mechanism for said member including a yoke, said yoke being connected at a point intermediate its extremities to said member and being pivoted adjacent one end, an operating arm associated with the free end of the yoke for shifting the same on its pivot, an operating lever, a spring interposed between said operating lever and said arm, said spring being calibrated to cause a partial movement of said metal working elements upon operation of said lever and being effective in itself to complete the movements of said elements after said lever has reached a predetermined position, a retarding means operably engaging said arm, and means for adjusting said retarding means whereby only a predetermined portion of the tool movement may be retarded.

13. A grinding machine including a frame, a hollow rotatable spindle mounted in said frame, a tool carried by said spindle including radially shiftable metal working elements, a member axially movable of said spindle, one end of said member being connected to said metal working elements to radially shift the same, an operating mechanism for said member including a yoke, said yoke being connected at a point intermediate its extremities to said member and being pivoted adjacent one end, an operating arm associated with the free end of the yoke for shifting the same on its pivot, an operating lever, a spring interposed between said operating lever and said arm, said spring being calibrated to cause a partial movement of said metal working elements upon operation of said lever and being effective in itself to complete the movements of said elements after said lever has reached a predetermined position, a retarding means operably engaging said arm, means for adjusting said retarding means whereby only a predetermined portion of the tool movement may be retarded, and means for indicating the limit of movement of said retarder.

14. A honing machine comprising a spindle, an expansible hone carried by said spindle, a positively actuated operating member having a predetermined stroke for controlling the expansion of said hone, a resilient connection between said member and said hone, and means for limiting the rate of expansion of said hone, regardless of the rate of operation of said operating member.

15. A honing machine comprising a spindle, an expansible hone carried by said spindle, a positively actuated operating member, connections including a resilient link between said operating member and said hone for controlling its expansion and contraction, said connections being constructed and arranged to cause the first part of the movement of said hone in one direction to be accomplished at the same rate as the movement of said operating member, and means for preventing the latter part of such movement from occurring at more than a predetermined rate, regardless of the rate of operation of said operating member.

JOSEPH SUNNEN.